(12) United States Patent
Wehler et al.

(10) Patent No.: US 7,600,719 B2
(45) Date of Patent: Oct. 13, 2009

(54) CARRYING STRAP AND LINE-GUIDING SYSTEM FOR THE STATIONARY GUIDING OF WIRES, CABLES, OR SIMILAR

(75) Inventors: Herbert Wehler, Neunkirchen (DE); Uwe Kemper, Kreuztal (DE)

(73) Assignee: Kabelschlepp GmbH, Siegen (DE)

( * ) Notice: Subject to any disclaimer, the term of this patent is extended or adjusted under 35 U.S.C. 154(b) by 564 days.

(21) Appl. No.: 10/503,670

(22) PCT Filed: Jan. 16, 2003

(86) PCT No.: PCT/EP03/00420

§ 371 (c)(1),
(2), (4) Date: Mar. 29, 2005

(87) PCT Pub. No.: WO03/067729

PCT Pub. Date: Aug. 14, 2003

(65) Prior Publication Data

US 2005/0224317 A1 Oct. 13, 2005

(30) Foreign Application Priority Data

Feb. 7, 2002 (DE) ............................ 102 05 129
Jun. 14, 2002 (DE) ............................ 102 26 719

(51) Int. Cl.
*F16L 3/015* (2006.01)
*F16L 3/02* (2006.01)

(52) U.S. Cl. .............................. 248/49; 248/51; 248/55; 59/78.1

(58) Field of Classification Search .................. 248/49, 248/51, 55; 59/78.1
See application file for complete search history.

(56) References Cited

U.S. PATENT DOCUMENTS

| 3,248,036 | A | * | 4/1966 | Weiss | 206/196 |
| 3,262,549 | A | * | 7/1966 | Stewart et al. | 198/692 |
| 3,904,028 | A | * | 9/1975 | Muller | 198/850 |
| 4,682,686 | A | * | 7/1987 | Ueda et al. | 198/850 |
| 4,840,023 | A | * | 6/1989 | Borsani | 59/78.1 |
| 5,836,148 | A | * | 11/1998 | Fukao | 59/78.1 |
| 6,516,602 | B2 | * | 2/2003 | Sakai et al. | 59/78.1 |
| 6,952,916 | B1 | * | 10/2005 | Fountaine | 59/78.1 |

FOREIGN PATENT DOCUMENTS

| DE | 196 47 322 A1 | 5/1998 |
| DE | 198 60 948 A1 | 7/2000 |
| DE | 199 15 035 A1 | 10/2000 |
| DE | 100 30 985 A1 | 1/2002 |
| EP | 0 789 167 A1 | 8/1997 |
| WO | WO 98/40645 | 9/1998 |

* cited by examiner

*Primary Examiner*—Mark A Deuble
(74) *Attorney, Agent, or Firm*—Smith Law Office (57) ABSTRACT

The supporting belt (1) according to this invention of a line guidance unit (2) for guiding lines, cables or the like is characterized in that the supporting belt (1) has alternating supporting sections (3) and articulated sections (8), and the supporting sections (3) and the articulated section (8) are made of materials having different properties by the multicomponent process. With the help of the supporting belt (1) according to this invention, the line guidance unit (2) according to this invention, comprising such a supporting belt (1), as well as the method according to this invention for producing the supporting belt (1) according to this invention, it is possible to achieve a guidance of lines, cables or the like in a simple, rugged, reliable and inexpensive manner.

9 Claims, 8 Drawing Sheets

CARRYING STRAP AND LINE-GUIDING SYSTEM FOR THE STATIONARY GUIDING OF WIRES, CABLES, OR SIMILAR

The object of this invention relates to a supporting belt for a line guidance unit, a line guidance unit for guiding lines, cables or the like and a method of producing a supporting belt.

Modern working machines, whether they perform static and/or dynamic operations, have a plurality of electric, hydraulic and/or pneumatic inlet and outlet lines, e.g., for controlling movable consumers. For guiding such lines, in particular from a stationary connection point to a movable consumer, so-called line guidance elements are used.

Line guidance units for guiding lines, cables or the like having a first end which is arranged in a stationary mount and having a second end which is movable are known in numerous embodiments. The classical line guidance unit, which is also referred to as an energy guidance chain consists of individual chain links joined together in an articulated manner to form a guidance channel. Lines, cables or the like are arranged in this guidance channel.

WO 98/40645 describes a line guidance unit consisting of one-piece protective elements made of plastic. The protective element is made by injection molding or casting in one piece and has parts that are interconnected by bendable bridges. The protective element has a bottom segment with a top side and a bottom side and at least one wall segment which can be shaped into a closed channel section by mechanically closing a closing mechanism, whereby the protective element is preferably connected or connectable to other similar protective elements so that the channel sections in one longitudinal direction form a channel for lines.

Another embodiment of the line guidance unit is known from European Patent 0 789 167 A1. This line guidance unit is also used for active guidance of lines, cables or the like, having a first end, which is arranged in a stationary mount, and having a second end which is movable. The line guidance unit has a channel formed by segments. The segments are connected to a supporting belt. During operation of the line guidance unit, it and thus also the supporting belt form a lower trunk line and an upper trunk line as well as an area of curvature between the upper and lower trunk lines as illustrated in FIG. 1 of WO 98/40645 and in FIG. 13 of European Patent 0 789 167 A1.

The diameter of the area of curvature also determines the amount of space required for installation of the line guidance unit. In the case of line guidance arrangements having a relatively small structural height, a relatively large amount of space may also be required in view of the flexural strength of the supporting belt.

Modern work places, especially in large office areas in the industry, in administration and in commerce require, for example, power and telecommunications connections in the immediate vicinity of each workstation, in particular grounded plug receptacles for electronic devices, for telephones and computers, light switches, automatic circuit breakers, surge suppressors and many other devices.

It is known that so-called cable channels and current carrying or other feeder lines for electric or electronic equipment mounted or otherwise placed on the furniture can be guided in a defined manner on office furniture such as desks and computer stands or special furniture for music and film studios, and these cable channels are installed in such a way that the cables are not exposed. Such cable channels are used to protect the cables and also to protect the user of the equipment. In addition, such cable channels prevent the device from being torn down from the furniture in question.

German Patent 199 15 035 A1 describes a line guidance device for guiding at least one line whereby the line guidance device is composed of members that connect a first and second guidance section of adjacent members.

The diameter of the area of curvature also determines the amount of space required for installation of the line guidance unit. In the case of line guidance arrangements having a relatively small structural height, a relatively large amount of space may be required in view of the flexural strength of the supporting belt.

Against this background, the object of the present invention is to provide a supporting belt and a line guidance unit with which the space required for installation of the line guidance unit is reduced. In addition, a method of producing a supporting belt for reducing the space required for installation of the line guidance unit is to be described.

This object is achieved according to this invention by a supporting belt having the features of Claim 1, by a line guidance unit having the features of Claim 10 and/or by a method having the features of Claim 24. Advantageous refinements and embodiments, which may be used individually or combined in any desired manner are the object of the dependent claims.

The supporting belt according to this invention for a line guidance unit for guiding lines, cables or the like is characterized in that the supporting belt is formed by supporting sections and articulated sections. The supporting sections and the articulated sections are arranged in alternation. They are formed by materials having different properties in the multicomponent method.

This embodiment of the supporting belt according to this invention achieves the result that the area of curvature which is formed, for example, in formation of an upper line trunk and a lower line trunk, is relatively small because only the articulated section with its flexural rigidity influences this [area of curvature]. The supporting section here may be designed as an essentially rigid body, while the articulated section connecting two supporting sections is made of a material which is very flexible. Through a suitable selection of the material of which the articulated section is formed, it is possible for the flexibility of the articulated section to be varied, i.e., adapted to the requirements of the area of curvature of the lines or hoses.

The supporting belt with its supporting sections and articulated sections is preferably produced by the multicomponent injection method. As an alternative, the supporting sections and the articulated sections may also be produced by the multicomponent extrusion method. If the multicomponent extrusion method is used, then the supporting belt as such may be extruded. As an alternative, it is also possible to design first a blank in the form of a sheet having supporting sections and articulated sections which are then divided across the direction of extrusion. This method of producing the supporting belt also has the advantage that supporting belts of different widths can be produced.

To reduce the inherent weight of the supporting belt and optionally to increase its strength, it is proposed that at least the supporting sections be designed as profiles, preferably hollow profiles. In particular, the design of the supporting sections as hollow profiles has the advantage that relatively great savings of material are possible, which is associated with economical production of the supporting section. In addition, an increased rigidity of the supporting belt is achieved with the design of the supporting belt as a hollow profile.

The supporting belt of a line guidance unit for guiding lines, cables or the like preferably includes at least two supporting belt sections that are joined together. Joining several sections together makes it possible to design supporting belts of any desired length. Furthermore, joining the sections in this way makes it possible to adapt the length of the supporting belt accurately to the respective application according to a modular principle. It is also possible to arrangement multiple sections side-by-side and connect them so that this also increases the possible variations in the width of the supporting belt and thus the line guidance unit. In addition, one supporting belt section may also be connected to at least two other supporting belt sections. This makes it possible to divide and/or combine the lines, cables or the like guided in a line guidance unit between at least two line guidance units.

The supporting belt sections are preferably joined together in a form-fitting manner and/or in a frictionally engaged manner. In particular it is proposed that the sections be detachably joined together. This detachability yields a particular flexibility in use of the supporting belts. In particular, long supporting belts can be shortened again as needed with no problem. As an alternative, the supporting belt sections may also be inseparably joined together. There is the possibility here of joining the supporting belt sections together through suitable joining means. Joining means include, for example, holding clips. Instead of the use of joining means for designing an inseparable connection of the supporting sections, the supporting sections may also be glued or welded together according to another proposal.

In an advantageous embodiment of this invention, the supporting sections are trapezoidal and/or rhomboidal in shape. With the help of trapezoidal and/or rhomboidal supporting sections, it is possible to influence the belt taken up by the supporting belt in three-dimensional space and to tailor it to size. In particular, due to the specification of a symmetrical trapezoid, the supporting belt forms a helix, where the pitch of the helix is defined by the angle of the supporting sections to one another. With such a supporting belt, it is possible to securely guide the lines of a robot arm, for example, which executes a sliding rotational movement, i.e., a combination of a translatory movement and a rotational movement. As an alternative, the joint sections may also be designed in the form of a trapezoid and/or a rhombus. Due to the trapezoidal and/or rhomboidal design of the articulated sections, the elastic properties of the supporting belt are influenced. In particular this permits tilting movements about an axis along the supporting belt.

The line guidance unit according to this invention for guiding lines, cables or the like has a channel which is formed at least in part by at least one supporting belt. The supporting belt has alternating supporting sections and articulated sections. The supporting sections and the articulated sections are formed by materials having different properties in the multi-component method. Due to this inventive design of the power [sic; line] guidance unit, this creates the possibility of providing a highly flexible line guidance unit, which is very adaptable to the intended application. The line guidance unit preferably has a supporting belt, which is designed according to one of Claims 1 through 9. In particular, it is proposed that the channel be formed by segments, which are attached to at least one supporting belt. This reduces the space required for installation of the line guidance unit.

It is possible for the segments to be connected to each supporting section. This is not absolutely necessary. For example, selected supporting sections may be connected to segments. Several supporting sections may also be connected to just one segment. This has an influence on the rigidity of the line guidance unit which is especially important when a long line guidance unit is to be pushed together, compressed, stacked or rolled up and subjected to a compressive load. Due to the stiffening of multiple supporting sections, it is possible to predetermine the behavior of the line guidance unit under a compressive load. In particular to achieve an especially tight packing of a collapsible line guidance unit, this can be correlated with how many layers a line guidance unit forms when folded up.

For an easy adaptation of the line guidance unit according to this invention to different application cases, it is proposed that the segments be connected to the supporting sections in a form-fitting manner and/or in a frictionally engaged manner. In particular, it is proposed that the segments be detachably connected to the supporting sections. Instead of a detachable connection of individual segments to the supporting sections, it is also possible for the segments to be inseparably connected to the supporting sections. This may be accomplished by gluing or welding, for example.

In particular is it proposed that for detachable connection of the segments to the supporting sections, these should have connecting means. The connecting means may be designed as clip arrangements or plug connections.

Preferably a line guidance unit is proposed in which the segments have side walls and each supporting section and/or at least one side wall has a recess as the connecting means and/or has a first projection, these being designed so that the first projection engages in the recess. This creates the possibility of a simple and compact design of the line guidance unit according to this invention. In particular this measure makes it possible to adapt the line guidance unit to the particular concrete application case according to a modular principle.

According to yet another advantageous embodiment of the line guidance unit, it is proposed that at least one supporting section have a bushing running across the longitudinal direction of the supporting belt so that at least one connecting element, which connects the side walls of a segment, passes through this bushing. This provides a modular design of the line guidance unit which has a high flexibility with regard to different application cases, whereby the number of components required to construct the line guidance unit is relatively small.

To simplify the assembly of the line guidance unit, according to yet another advantageous embodiment of the line guidance unit according to this invention it is proposed that at least one segment shall have side walls which are connected by a first transverse web. The side walls each have a second projection facing one another, whereby the supporting section is arranged between the first transverse web and the second projections. By compressing the end areas of the side walls opposite the first and/or second projections, the distance between the projections is increased, so that the belt can be inserted into the free space between the first transverse web and the projections without requiring complicated handling.

Advantageously at least one segment has side walls connected by a second transverse web. The second transverse web contributes to the rigidity of the line guidance unit. It also produces a seal of the interior space of the line guidance unit in that the second transverse web essentially covers the segment. As an alternative, at least one segment has side walls, whereby at least one side wall has a partial web which faces the opposite side wall. With the help of the partial web, lines, the cable or the like may be easily inserted into the line guidance unit and removed from it. With the help of a partial web it is also possible to increase the distance between the projections by compressing the end areas of the side walls opposite the first and/or second projections in order to thereby insert the supporting belt into the free space formed between the first transverse web and the projections.

Advantageously at least two adjacent segments each have a side wall, whereby at least the one side wall has an overlap area which overlaps with the other side wall. The overlap area may have two functions: first, it produces a seal between the segments, so that the lines, the cables or the like are less exposed to influences from the environment. Secondly, the overlap area results in an improved stability and in particular a greater rigidity of the line guidance unit with respect to unwanted twisting or tilting of the segments relative to one another.

The overlap area is preferably designed to essentially have the shape of an arc of a circle. The arc of the circle is preferably dimensioned according to the tilt angle of the supporting sections. The arc-shaped overlap area results in a high rigidity and/or a good seal of the line guidance unit while consuming very little material and reducing the weight of the line guidance unit.

In a special embodiment, the segments are connected to two supporting belts. The supporting belts here are guided essentially in parallel. Due to the parallel guidance of the supporting belts, comparatively wide line guidance units with only a low structural height may be formed. In particular, this makes it possible to save on material. The width of the line guidance unit may also be adapted to the respective application case in this way.

The supporting belt according to this invention for a line guidance unit as well as the line guidance unit according to this invention may be used for both passive and active guidance of lines, cables or the like. In active guidance, the supporting belt and/or the line guidance unit may be connected to corresponding devices or machine parts. Therefore, the line guidance unit has a first end which can be secured or is arranged in a stationary mount, and it has a second end which is connected to the moving device. In a passive guidance, the ends of the line guidance unit are arranged in a stationary mount.

The method according to this invention for producing a supporting belt, in particular a supporting belt according to this invention, includes the following steps: a sheet is formed from alternating supporting strips and articulated strips, whereby the supporting strips and the articulated strips are formed from materials having different properties in the multicomponent process; the sheet is divided into supporting belts in a direction across the articulated strips. With the help of this method, a plurality of supporting belts may be produced simultaneously in an effective manner. The supporting strips and the articulated strips are advantageously produced according to the multicomponent injection method. As an alternative, the supporting strips and the articulated strips are produced according to the multicomponent extrusion method.

To save on material and to increase the rigidity of the supporting strips, the supporting strips are designed as profiles, preferably as hollow profiles.

Additional details and advantages of the supporting belt according to this invention as well as the line guidance unit according to this invention are explained below on the basis of the exemplary embodiments illustrated in the drawing, although the object of this invention is in no way restricted by these embodiments.

Figure 1:
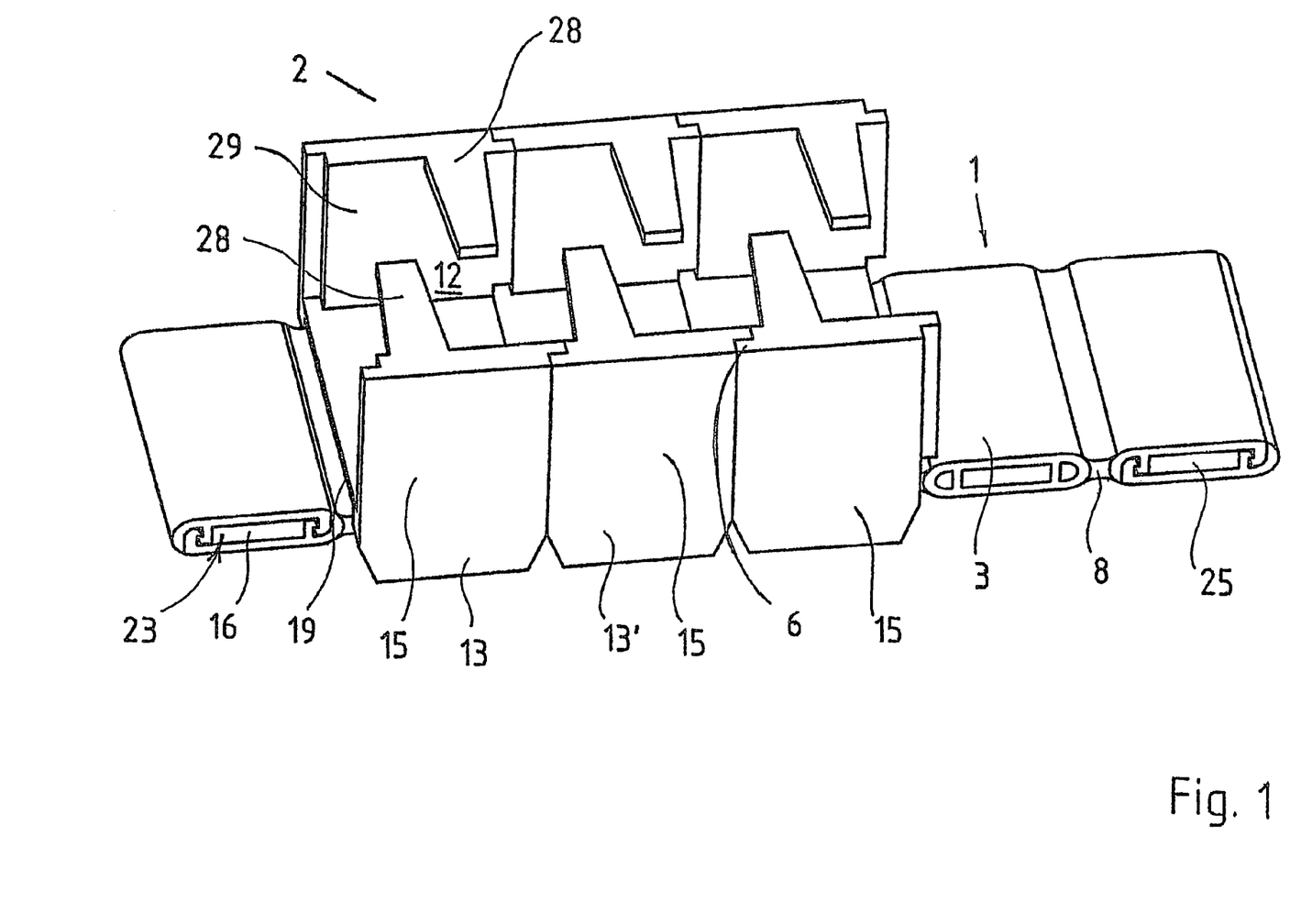
FIG. 1 a line guidance unit according to this invention in a perspective inclined view.

FIG. 1 shows a line guidance unit 2 according to this invention having a supporting belt 1 according to this invention in a perspective oblique view, whereby the supporting belt 1 includes supporting sections 3 and articulated sections 8 which are joined together with the help of a dual component injection molding technique. To the supporting belt 1 are connected segments 13, 13' which have side walls 15, 15' which form a channel 12 which can accommodate lines or cables or the like (not shown). Each side wall 15 is opposite another side wall 29. The side walls 15, 15' each have a partial web 28 which extends in the direction of the opposite side wall 29. With the help of the partial webs 28 it is readily possible to introduce lines or cables into the channel 12.

The supporting sections 3 are designed with a profile 23 which reduces the weight of the supporting belt 1 and increases the rigidity of the supporting section 3. The profile 23 includes a recess 16 to which segments 13, 13' and/or side walls 15, 15', 29 can be attached. The side walls 15, 15', 29 have an overlap area 6 with which channel 12 is sealed at the side walls 15, 15', 29 with a curvature of the line guidance unit 2. The overlap area 6 also results in an additional stability of the line guidance unit 2 due to the fact that it can absorb lateral forces applied through the side walls 15, 15', 29. FIG. 1 also illustrates a bushing 25 running across the longitudinal direction of the supporting belt 1 so that at least one, a connecting element connects the side walls 15, 15' of a segment 13, 13' by passing through this bushing 25. This provides a modular design of the line guidance unit which has a high flexibility with regard to different application cases, whereby the number of components required to construct the line guidance unit is relatively small. The segments 13, 13' are joined together with the overlap sections 6 in a rotationally fixed manner about the longitudinal axis of the supporting belt 1. Such a line guidance unit 2 can be produced inexpensively in a simple manner and is characterized by a great versatility and flexibility in use.

Figure 2:
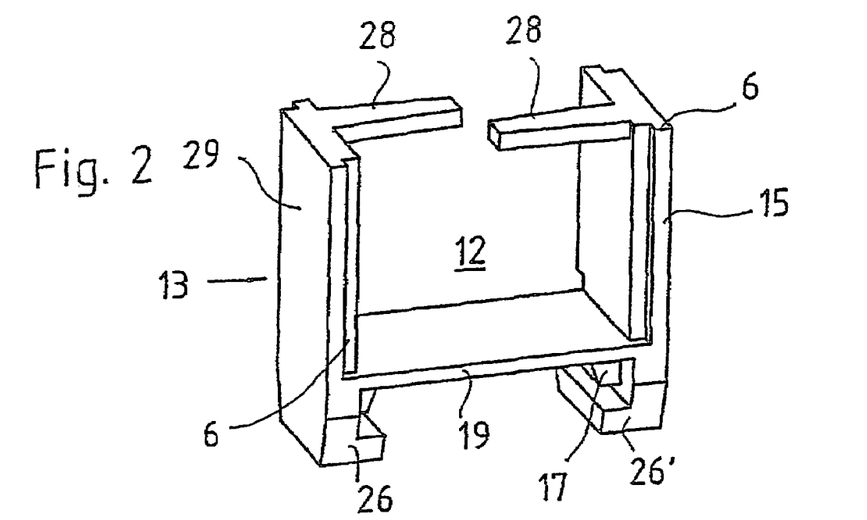
FIG. 2 a segment of the line guidance unit according to this invention as shown in FIG. 1 in a perspective inclined view.

FIG. 2 shows the segment 13 according to FIG. 1 in a perspective oblique view with side wall 15 and the opposite side wall 29 which are joined together by a first transverse web 19 and form the channel 12. The channel 12 is also bordered by the partial web 28. The side walls 15, 29 have the overlap region 6 with which the segment 13 can be attached to its adjacent segment 13'. Beneath the first transverse web 19 is a first projection 17 which can engage in the recess 16 of the supporting section 3 of the supporting belt 1. Likewise beneath the first transverse web 19, the side walls 15, 29 each have a second projection 26, 26' facing one another, whereby the supporting section 3 can be arranged between the first transverse section 19 and the second projections 26, 26'.

Figure 3:
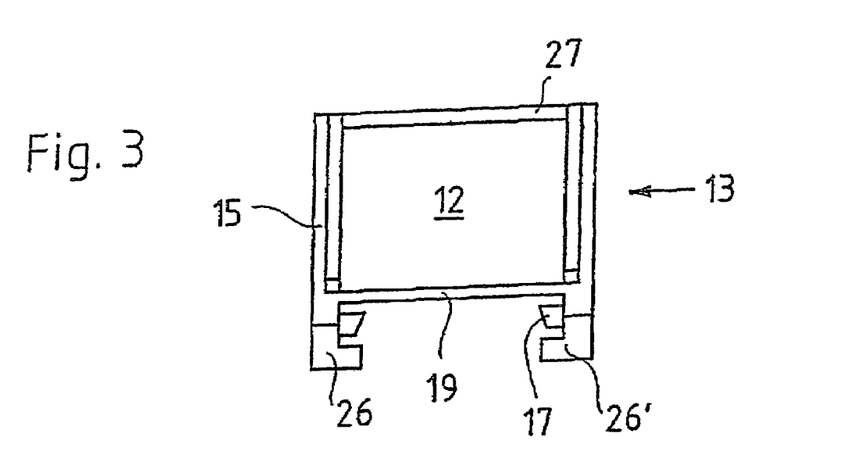
FIG. 3 an alternative embodiment of the segment according to FIG. 2 in a front view.

FIG. 3 shows the segment 13 according to FIG. 2 in a front view, where the partial web 28 is designed as a second transverse web 27 so that the channel 12 is completely closed. This also shows that the supporting belt 1 may be secured between the second projections 26, 26' and the first transverse web 19. The first projection 17, which engages in the recess 16 of the supporting belt 1, also contributes to this attachment.

Figure 4:
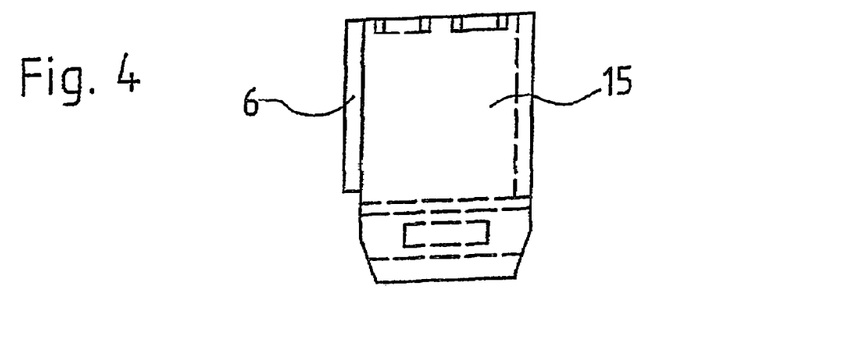
FIG. 4 the segment according to FIG. 2 in a side view.

FIG. 4 shows segment 13 according to FIG. 2 in a side view. This shows side wall 14 with the overlap area 6 for connecting the side wall 15 to an adjacent side wall.

Figure 5:
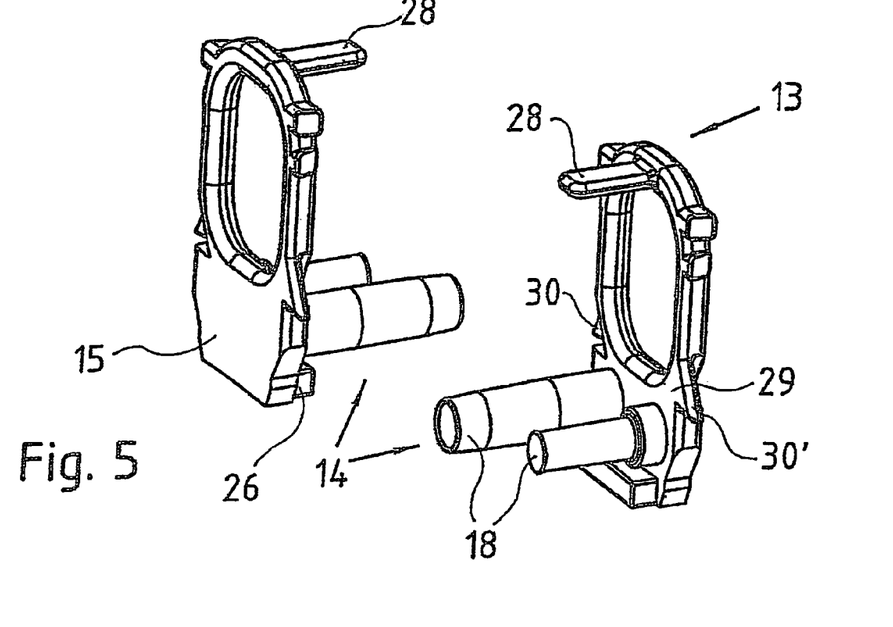
FIG. 5 an alternative embodiment of a segment for another line guidance unit according to this invention in a perspective oblique view.

FIG. 5 shows a segment that can be assembled in a perspective oblique view with connecting means 15 formed by connecting elements 18 with which the side walls 15, 29 can be joined together. The supporting belt 1 is clamped between the connecting element 18 and the second projection 26 on its supporting section 13. A third projection 30, 30' also contributes toward stabilization of the line guidance unit 2 in that a third projection 30 a segment 13 engages behind the third projection 30' of an adjacent segment 13'.

Figure 6:
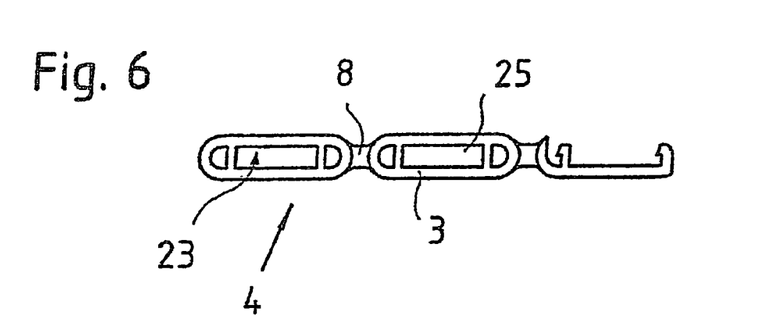
FIG. 6 a section of the supporting belt according to this invention in a longitudinal section.

FIG. 6 shows a first section 4 of a supporting belt 1 according to this invention in a longitudinal section. The supporting sections 3 are joined together by articulated sections 8, whereby the supporting sections 3 are designed as a profile 23.

Figure 7:
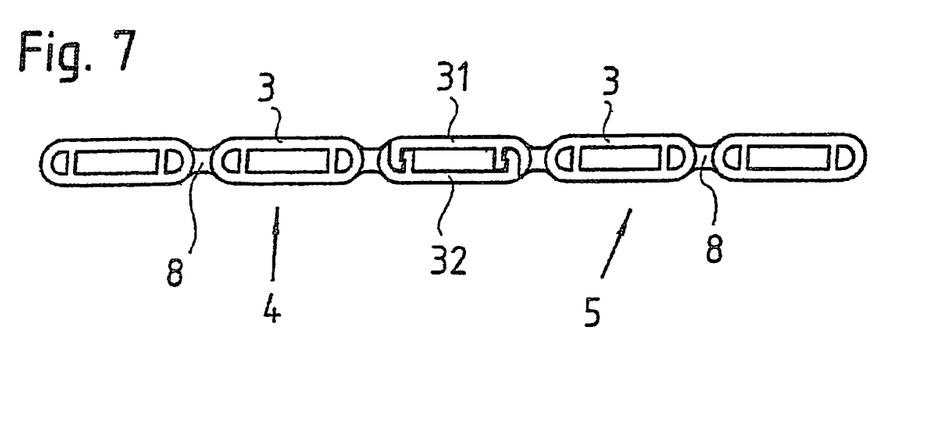
FIG. 7 two sections joined together according to FIG. 6.

FIG. 7 shows two sections which are joined together, namely a first section 4 and a second section 5 which are detachably jointed together. In this way the length of the supporting belt 1 can be lengthened or shortened depending on the application case. For detachable joining, a first connecting piece 31 and a second connecting piece 32 are used; these pieces can engage in one another and can preferably be clipped together.

Figure 8:
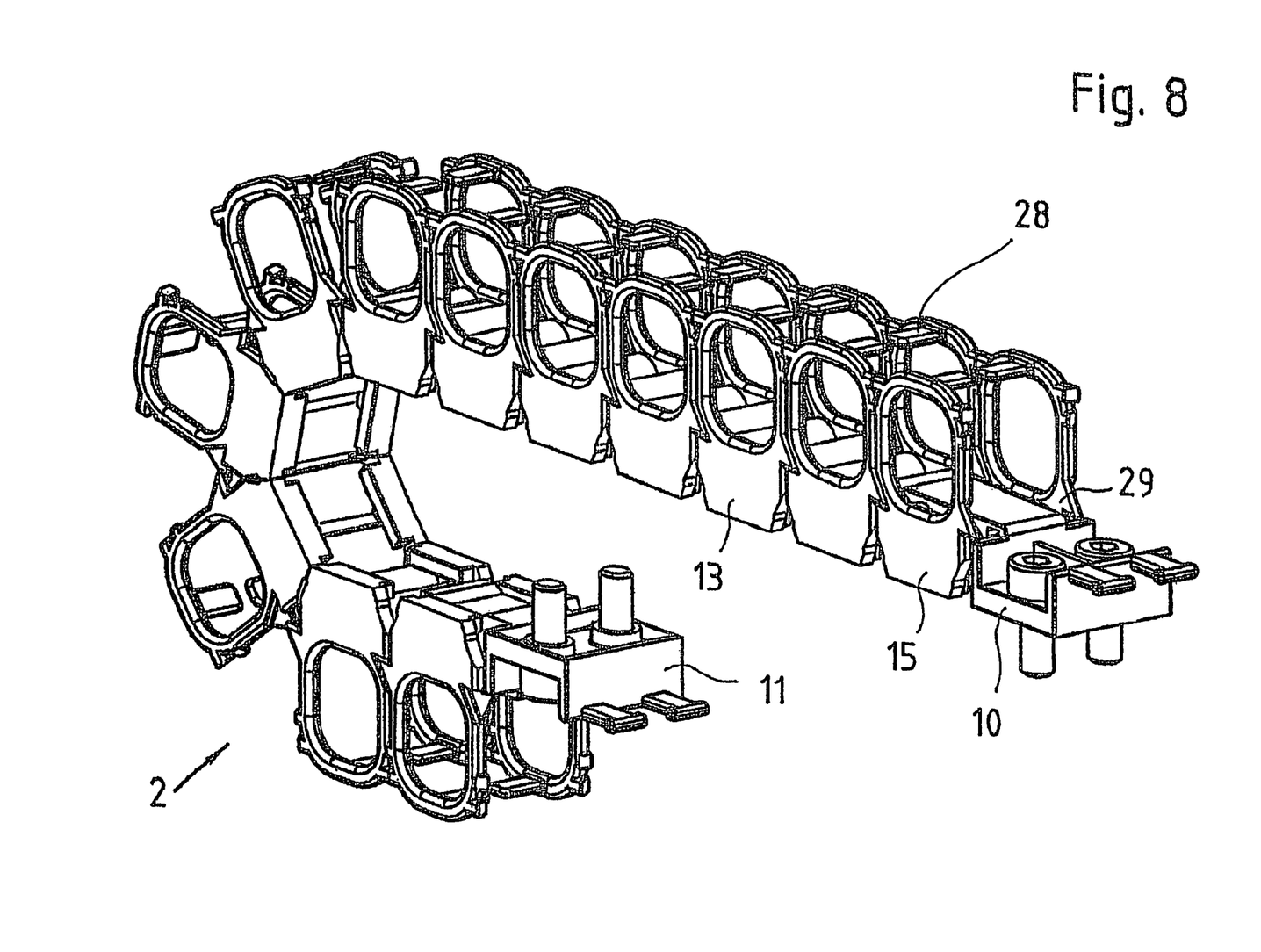
FIG. 8 an energy guidance unit according to this invention having segments according to FIG. 5.

FIG. 8 shows an alternative embodiment of the line guidance unit 2 according to this invention having segments 13 and side walls 15, whereby a first end 10 of the line guidance unit 2 can be secured at a fixed location in space, and a second end 11 of the line guidance unit 2 can be attached to a movable part, e.g., a robot arm (not shown).

Figure 9:
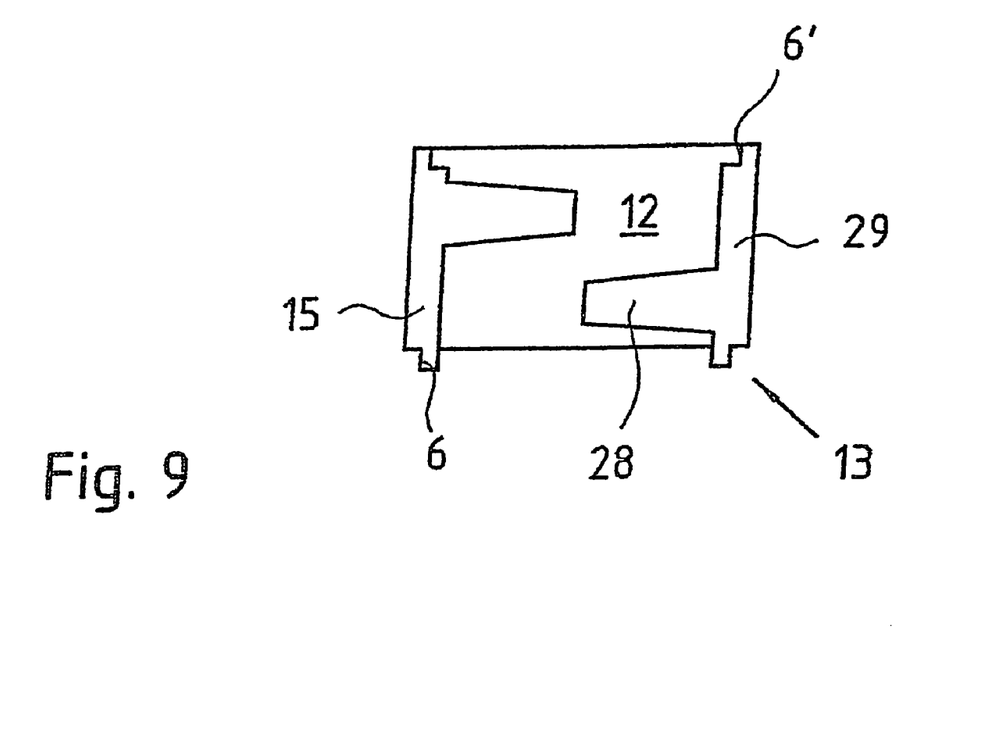
FIG. 9 a segment according to FIG. 2 in a top view.

FIG. 9 shows the segment 13 according to FIG. 2 in a top view, with side wall 15 and the opposite side wall 19 from which a partial web 28 extends to the other side wall 15, 29. The side walls 15, 29 have overlap areas 6, 6' for stabilizing the line guidance unit 2 with respect to rotation along a longitudinal axis of the supporting belt 1, i.e., with respect to tilting of two adjacent segments 13. The overlap areas 6, 6' seal the channel 12 toward the side.

Figure 10:
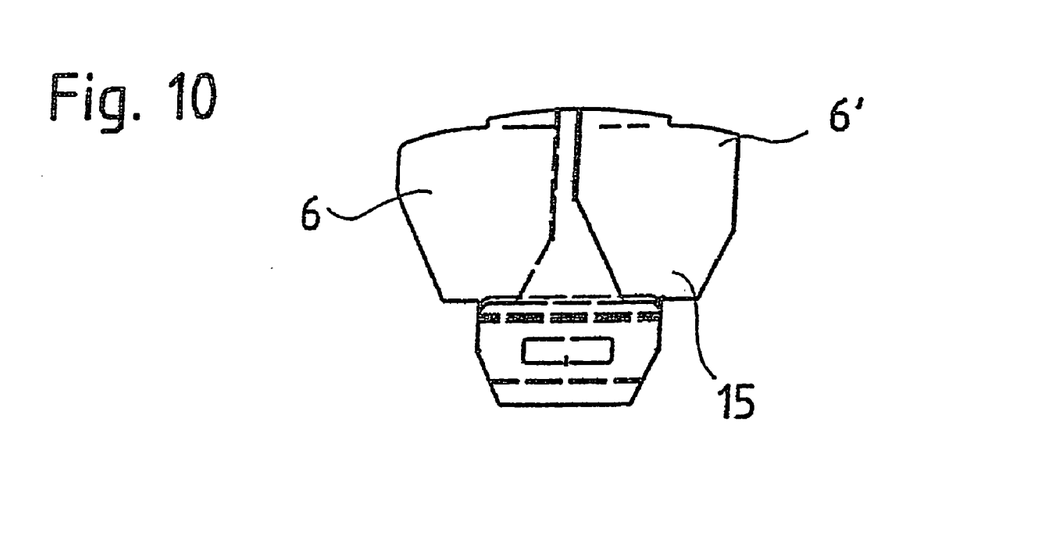
FIG. 10 an alternative embodiment of a side wall according to FIG. 4 in a side view.

FIG. 10 shows a side wall with an alternative embodiment of the overlap area 6, 6', where the overlap area 6, 6' is designed as an arc of a circle. This is especially advantageous when the supporting belt 1 and/or the line guidance unit 2 is curved and thus the openings formed between segments 13, 13' must be covered.

Figure 11:
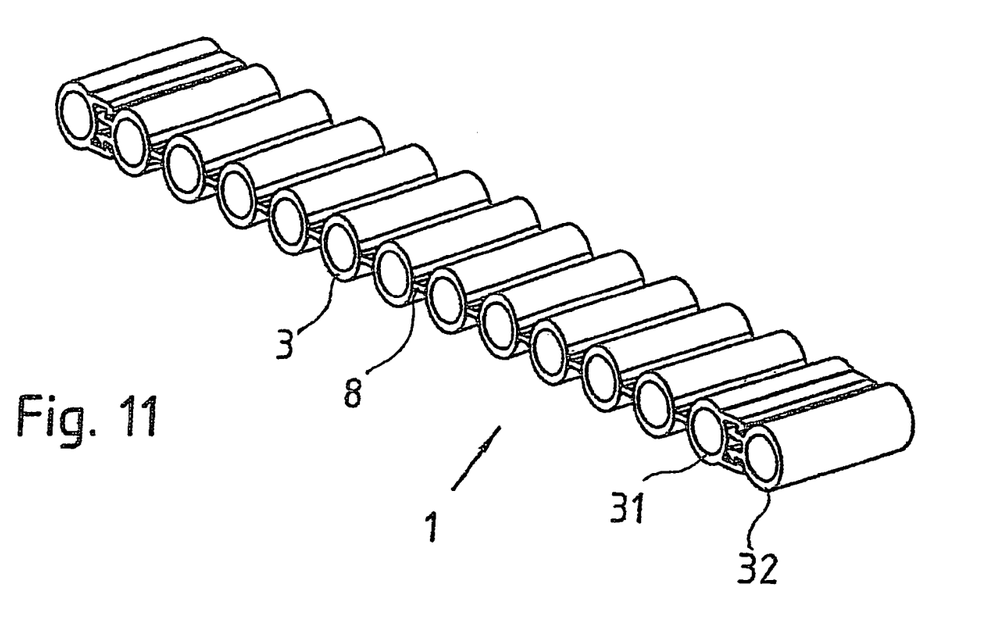
FIG. 11 another supporting belt according to this invention in a perspective oblique view.

FIG. 11 shows another embodiment of the supporting belt 1 according to this invention, where the supporting sections 3 are designed as hollow tubes and the articulated sections 8 are designed as webs. The first connecting piece 31 is a receptacle for the second connecting piece 32. With the help of these two connecting pieces 31, 32, the supporting belt 1 can be lengthened as desired or its length can be adapted. The supporting belt 1 can also be secured at its ends thereby.

Figure 12:
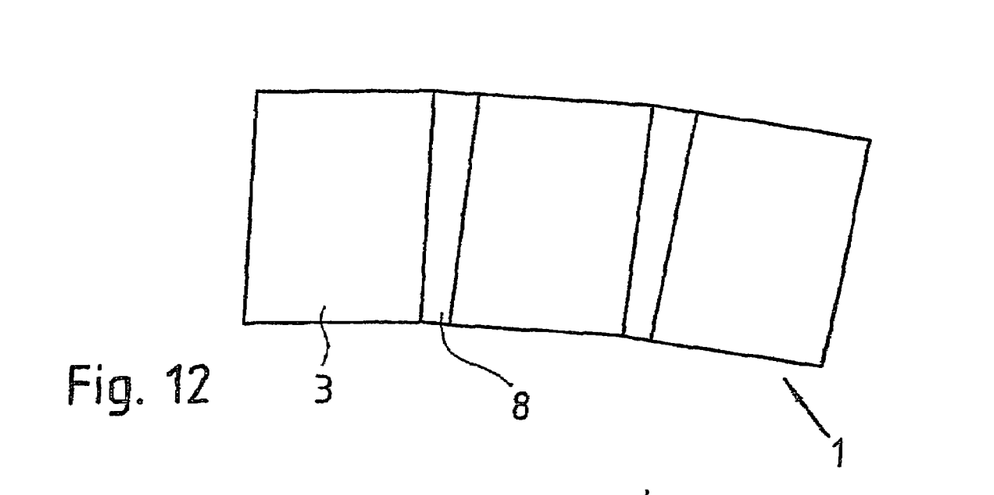
FIG. 12 an alternative supporting belt according to this invention in a top view.

FIG. 12 shows another embodiment of the supporting belt 1 according to this invention having supporting sections 3 and are articulated sections 8, where the supporting section 3 and/or the articulated section 8 are designed to be trapezoidal and/or rhomboidal. A trapezoidal design of the supporting section 13 defines a certain path which the supporting belt can assume in three-dimensional space. With a symmetrical trapezoid, for example, the supporting belt 1 may execute a helical movement.

Figure 13:
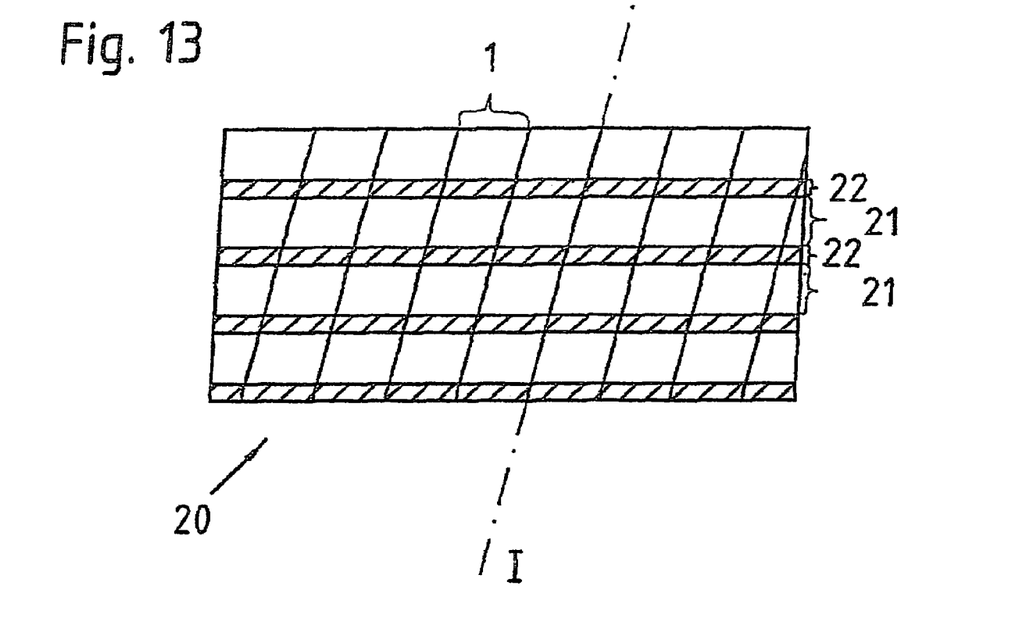
FIG. 13 a sheet for producing a supporting belt according to this invention in a top view.

FIG. 13 shows a sheet 20 with which a plurality of supporting belts 1 can be produced at the same time by the fact that such a sheet 20 with supporting strips 21 and articulated strips 22 is either extruded or produced by injection molding in a dual component process, and the sheet 20 is cut into supporting belts 1 in a direction I across the supporting strips 21 and/or articulated strips 22. The direction of this cut may run perpendicular to the supporting strips 21 and/or articulated strips 22, but it may also run across the former. This results in trapezoidal articulated sections 8 and supporting sections 3.

The supporting belt 1 according to this invention in a line guidance unit 2 for active guidance of lines, cables or the like is characterized in that the supporting belt 1 has alternating supporting sections 3 and articulated sections 8, and the supporting sections 3 and articulated sections 8 are made of materials having different properties by the multicomponent method. With the help of the supporting belt 1 according to this invention, the line guidance 2 according to this invention which includes such a supporting belt as well as the method according to this invention for producing the supporting belt 1 according to this invention, it is possible to achieve a guidance of lines, cables or the like in a simple, rugged and inexpensive manner.

The supporting belt according to this invention and the line guidance unit according to this invention are also suitable for active guidance of lines, cables or the like. Line guidance units for active guidance of lines, cables or the like having a first end which is arranged in a stationary mount, and having a second end which is movable are known in numerous embodiments. The traditional line guidance unit, which may also be referred to as an energy guidance chain, consists of individual chain members linked together in an articulated manner to form a guidance channel. Lines, cables or the like are arranged in this guidance channel. WO 98/40645 discloses a line guidance unit consisting of one-piece protective elements made of plastic. The protective element is produced by injection molding or casting in one piece and has parts connected to one another by bendable bridges. The protective element has a bottom segment having a top side and a bottom side and at least one wall segment which can be shaped into a closed channel section by bending and/or folding in the direction of the top side of the bottom segment by mechanical closing of a closing mechanism, whereby the protective element is preferably connected or connectable to other similar protective elements so that the channel sections form a channel for lines in a longitudinal direction.

Another embodiment of a line guidance unit is known from EP 0 789 167 A1. This line guidance unit is also used for active guidance of lines, cables or the like, having a first end which is arranged in a stationary mount and a second end which is movable. The line guidance unit has a channel formed by segments. The segments are connected to a supporting belt. During operation of the line guidance unit, it and thus also the supporting belt form a lower line trunk and an upper line trunk as well as an area of curvature situated between the upper and lower line trunks, as illustrated in FIG. 1 of WO 98/40645 and in FIG. 13 of EP0 789 167 A1.

Figure 14:
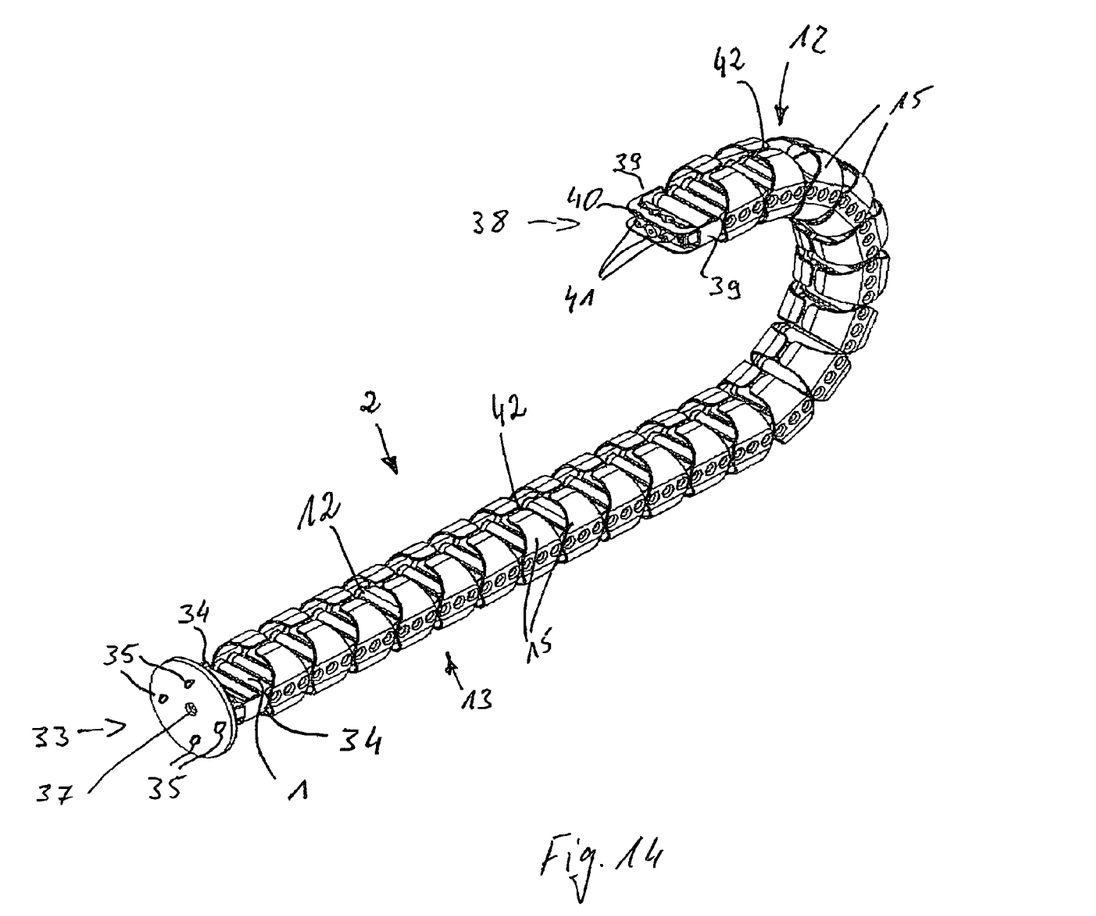
FIG. 14 an energy guidance device according to this invention having segments as illustrated in FIG. 11.

FIG. 14 shows a line guidance unit for stationary guidance of lines, cables or the like. The line guidance unit has a supporting belt 1 which corresponds essentially to the embodiment of the supporting belt 1 in FIG. 11. However this is not necessarily the case. Other designs and embodiments of the supporting belt may also be implemented. The one end of the line guidance unit 2 has a bottom part 33. The bottom part 33 has a fastening body 36. Two straps 34 extend away from the fastening body 36 and are connected in a form-fitting manner and optionally in a frictionally engaged manner to the supporting belt 1. Straps 34 have connecting means which engage in corresponding recesses in the supporting belt 1. The bottom part 33 may be connected to a bottom. To do so, the body 36 has boreholes 35. A supply opening 37 is provided for passing lines through the bottom part 33. Multiple supply openings 37 may also be provided so that it is possible to pass lines separately through the bottom part 33.

The term bottom part is not limited to this part having to be connected to a bottom. It is also possible for the bottom part to be connected to an Eden [sic; planar?] surface.

The opposite end of line guidance unit 2 has a fastening part 38. The fastening part 38 is designed with a U shape in the embodiment illustrated here. The free legs 39 have connecting means (not shown) by means of which the fastening means 38 is connected to the supporting belt. To secure the fastening part 38, corresponding openings are provided in base 40 through which fastening means such as screws may be passed.

The fastening part 38 is designed so that it is possible to secure the lines guided in the line guidance unit in a manner that relieves them of tensile stress.

Channel 12 is provided on both sides of the supporting belt 1. The channel 12 is bordered by the supporting belt 1 and by segments. The segments 13 have side walls 15 which extend toward both sides of the supporting belt. The side walls 15 are designed with a curvature in the embodiment illustrated here. The opposite end faces of the side walls 15 form an insertion gap 42 through which the lines can be introduced into a channel or removed from it. The side walls 15 are preferably designed so that they have a certain elasticity, thereby facilitating the introduction and removal of lines.

Segments 13 have connecting means. The connecting means are preferably such as those illustrated in FIG. 5.

Another embodiment of a line guidance unit is known from EP 0 789 167 A1. This line guidance unit is also used for active guidance of lines, cables or the like having a first end which is arranged in a stationary mount and a second end which is movable. The line guidance unit has a channel which is formed by segments. The segments are connected to a supporting belt. During operation of the line guidance unit, it and thus also the supporting belt form a lower line trunk and an upper line trunk as well as an area of curvature situated between the upper and lower line trunks as illustrated in FIG. 1 of WO 98/40645 and in FIG. 13 of EP 0 789 167 A1.

LIST OF REFERENCE NOTATION

1 supporting belt
2 line guidance unit
3 supporting sections
4 first section
5 second section
6,6' overlap area
8 articulated section
10 first end
11 second end
12 channel
13, 13' segments
14 connecting means
15, 15' side wall
16 recess
17 first projection
18 connecting element
19 first transverse web
20 sheet
21 supporting strip
22 articulated strip
23 profile
25 bushing
26, 26' second projection
27 second transverse web
28 partial web
29 opposite side wall
30, 30' third projection
31 first connecting piece
32 second connecting piece
33 bottom part
34 strap
35 borehole
36 body
37 supply opening
38 fastening part
39 leg
40 base
42 insertion gap
I direction

The invention claimed is:

1. A line guidance unit for guiding lines, cables or the like, the line guidance unit comprising:
 a channel formed at least in part by a supporting belt and the supporting belt comprises:
  alternating supporting sections and articulated sections and the channel further comprises segments having side walls, and each segment comprises a first projection adapted to engage a recess defined by a supporting section; and
 wherein at least one supporting section comprises a bushing extending transversely to the longitudinal direction of the supporting belt through which at least one connecting element extends, for connecting the side walls of a segment.

2. The line guidance unit of claim 1, wherein the supporting section is trapezoidal in cross-section.

3. The line guidance unit of claim 1, wherein the articulated sections are each trapezoidal in cross-section.

4. The line guidance unit of claim 1 wherein the segments are connected to the supporting sections in a form-fitting manner.

5. The line guidance unit of claim 1 wherein the segments are detachably connected to the supporting sections.

6. The line guidance unit of claim 1 wherein the segments and the supporting sections are joined together.

7. The line guidance unit of claim 1, wherein at least one segment side wall and at least one side wall has a partial web which opposes the opposite side wall.

8. A line guidance unit for guiding lines, cables or the like, the line guidance unit comprising:
 a channel formed at least in part by at least one supporting belt and comprising segments connected to the supporting belt, wherein the line guidance unit comprises:
 alternating supporting sections and articulated sections; wherein the supporting belt supporting sections are formed by two injection molded components; and
 wherein at least two adjacent segments each comprise a side wall and at least one side wall comprises an overlap area which overlaps with the adjacent side wall.

9. The line guidance unit of claim 8, wherein the overlap area is arc-shaped.

* * * * *